(12) United States Patent
Reuter et al.

(10) Patent No.: US 11,965,806 B2
(45) Date of Patent: Apr. 23, 2024

(54) AUTOMATED SAMPLING

(71) Applicant: Evonik Oxeno GmbH & Co. KG, Marl (DE)

(72) Inventors: Christian Reuter, Recklinghausen (DE); Dirk Fridag, Haltern am See (DE); Georg Nordhoff, Marl (DE); Sebastian Haumann, Haltern am See (DE); Alexander Brächer, Haltern am See (DE); Robert Franke, Marl (DE); Dieter Hess, Marl (DE)

(73) Assignee: Evonik Oxeno GmbH & Co. KG, Marl (DE)

( * ) Notice: Subject to any disclaimer, the term of this patent is extended or adjusted under 35 U.S.C. 154(b) by 16 days.

(21) Appl. No.: 17/805,765

(22) Filed: Jun. 7, 2022

(65) Prior Publication Data
US 2022/0390332 A1    Dec. 8, 2022

(30) Foreign Application Priority Data
Jun. 8, 2021   (EP) ..................................... 21178192

(51) Int. Cl.
*G01N 1/10* (2006.01)
*G01N 1/14* (2006.01)
*G01N 1/38* (2006.01)

(52) U.S. Cl.
CPC ................. *G01N 1/14* (2013.01); *G01N 1/38* (2013.01); *G01N 2001/1062* (2013.01)

(58) Field of Classification Search
CPC .... G01N 1/14; G01N 1/38; G01N 2001/1062; G01N 1/18; G01N 2001/105; G01N 2001/1031; G01N 1/2035; G01N 2001/205; G01N 1/10
USPC ......... 73/863.01, 23.22, 61.52, 61.56, 61.57, 73/61.59, 64.56, 863.72, 863.73, 864, 73/864.34, 864.81
See application file for complete search history.

(56) References Cited

U.S. PATENT DOCUMENTS

| | | |
|---|---|---|
| 2003/0103872 A1 | 6/2003 | Maier et al. |
| 2018/0180639 A1 | 6/2018 | Diaz et al. |

FOREIGN PATENT DOCUMENTS

| | | |
|---|---|---|
| EP | 0313972 | 5/1989 |
| GB | 2294761 | 5/1996 |
| WO | 01/75467 | 10/2001 |

OTHER PUBLICATIONS

European Search Report dated Oct. 24, 2022, in European Application No. 22175132.4, 6 pages.

*Primary Examiner* — Robert R Raevis
(74) *Attorney, Agent, or Firm* — Grüneberg and Myers PLLC

(57) ABSTRACT

An apparatus, for automated sampling from vessels that may be under a high pressure, is achieved by a specific construction with multiple multiport valves. A method of automated sampling can be used with the apparatus.

20 Claims, 1 Drawing Sheet

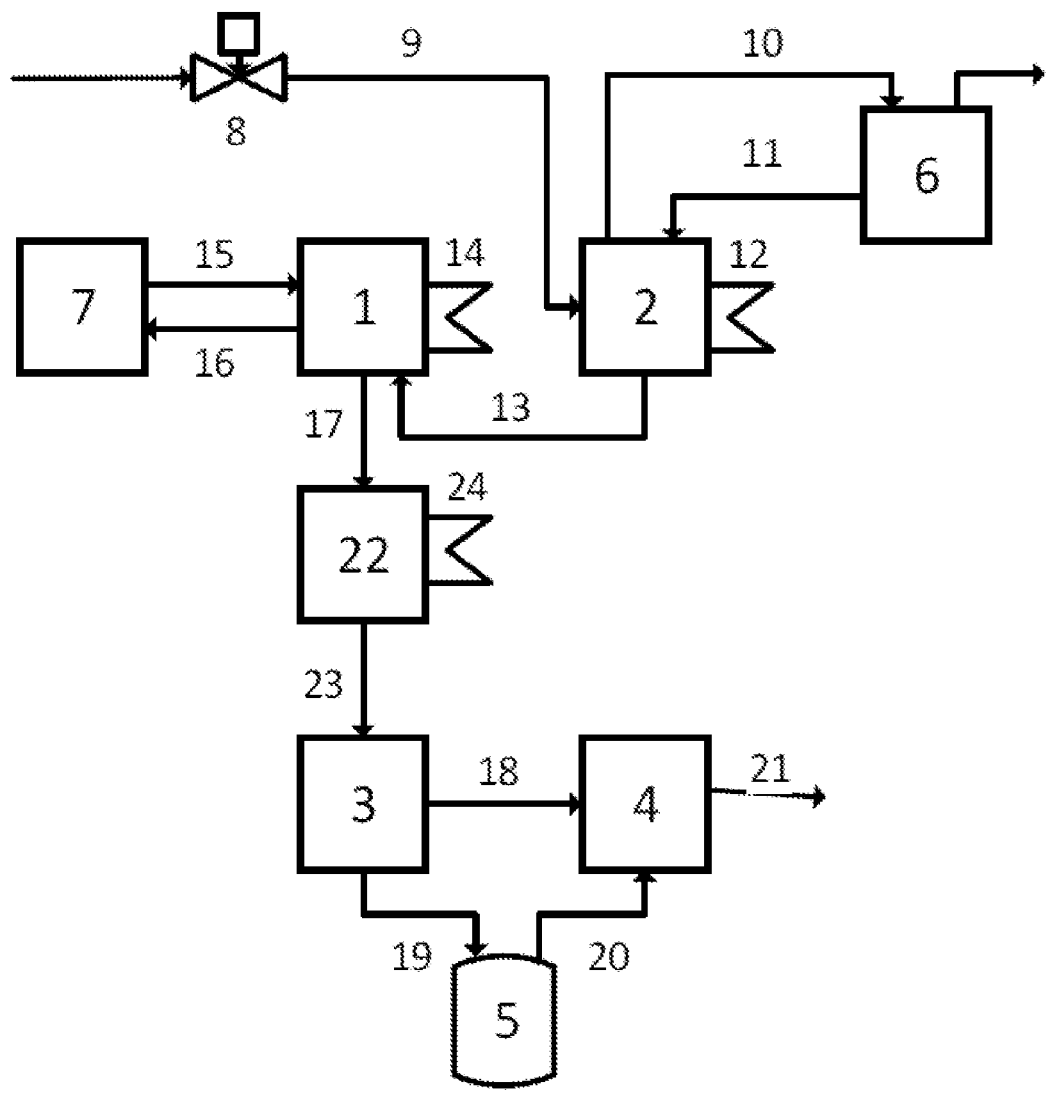

AUTOMATED SAMPLING

CROSS-REFERENCE TO RELATED APPLICATIONS

This application claims priority to European Application No. 21178192.7, filed on Jun. 8, 2021, the content of which is hereby incorporated by reference in its entirety.

BACKGROUND OF THE INVENTION

Field of the Invention

The present invention relates to an apparatus for automated sampling from vessels that may be under a high pressure. This is achieved by a specific construction with multiple multiport valves.

The invention additionally relates to a method of automated sampling using the apparatus according to the invention.

Description of Related Art

In order to be able to analyse chemical reactions or the progression thereof, it is often necessary to take samples from the reaction vessel or other vessels within the reaction system or industrial plant. The sample is therefore the liquid solution present in the reaction vessel or other vessel that corresponds, or should correspond, to the current state of the reaction. The sampling is therefore typically effected under the operating conditions that exist at that time or the conditions that exist in the vessel in question, such as pressure and temperature. If these operating conditions can be described as comparatively mild, meaning that, for example, the pressure is comparatively moderate and/or the temperature is moderate, taking of samples is relatively easily achievable and can even be effected manually, for example. The prior art also discloses automated sampling systems with which samples can be taken under comparatively mild conditions.

However, if the reaction conditions are more severe, sampling is not as easily possible. One example is reactions that take place under a high gas pressure, as, for example, in autoclaves, or in the case of particular reactions such as hydroformylation. The high gas pressure here means the pressure of a sparged liquid. It is also possible in these cases to implement manual sampling. However, this is disadvantageous for several reasons. For instance, reproducibility is generally poor, time resolution is low, and a high level of staff deployment is necessary. Quite apart from safety precautions, manual sampling under severe reaction conditions, especially a high pressure, is very complex. Automated systems that can take samples even at a high pressure are barely known or have further disadvantages. In particular, problems resulting from cross-contamination are possible here.

SUMMARY OF THE INVENTION

Accordingly, there is still a need for apparatuses for automatic, time-controlled sampling and storage of samples from reaction vessels or other vessels that may be at an elevated pressure of up to 483 bar and have temperatures of up to 150° C. A further problem addressed was that of providing a method of taking the samples under correspondingly severe conditions.

The underlying problem addressed by the present invention was solved by the apparatus and the method according to the description below. Preferred configurations are each specified in the description below.

The invention also includes the following embodiments:

1. Apparatus for automated sampling of a liquid sample from a vessel in which there may be a pressure of at least 20 bar, preferably of at least 50 bar, further preferably of at least 100 bar, more preferably of at least 150 bar, wherein the apparatus comprises the following:
   - a sample circuit comprising a multiport valve (1) having at least 6 ports, a feed conduit, a drain conduit and a sample loop, wherein a liquid sample of the solution present in the vessel can be withdrawn via the sample circuit;
   - a solvent circuit comprising a reservoir vessel for the solvent, a second multiport valve (2) having at least 6 ports, a pump, a feed conduit, a drain conduit and a solvent loop, wherein solvent for dilution of the sample can be added via the solvent circuit;
   - one or more sample vessels into which the liquid sample, preferably diluted with the solvent, can be routed;
   - a sample distribution unit comprising a third multiport valve (3) having at least 3 ports and at least one conduit connected to the one or more sample vessels, wherein the sample taken from the vessel via the conduit can be routed into the at least one sample vessel;
   - a pressure regulation unit with which the samples can be brought to ambient pressure, wherein the pressure regulation unit comprises a further multiport valve (22) having a restriction capillary and wherein the multiport valve (22) is disposed between the multiport valve (1) and the multiport valve (3); and
   - an inert gas circuit in which there is an inert gas, wherein the inert gas circuit comprises at least one valve, a feed conduit, a drain conduit, and conduits via which all the multiport valves present are connected to one another.

2. Apparatus according to embodiment 1, wherein the sample distribution unit has at least two multiport valves (3, 4).

3. Apparatus according to embodiment 1 or 2, wherein the inert gas is nitrogen, argon or helium.

4. Apparatus according to any of the preceding embodiments, wherein the pressure in the vessel from which the sample is to be taken is not more than 500 bar, preferably not more than 490 bar, more preferably not more than 480 bar.

5. Apparatus according to any of the preceding embodiments, wherein two ports of the first multiport valve (1) are connected via two interfaces to the vessel, two ports to the sample loop, and two ports to the conduits of the inert gas circuit.

6. Apparatus according to any of the preceding embodiments, wherein two ports of the second multiport valve (2) are connected to the reservoir vessel for the solvent, i.e. one inlet and one outlet, two ports to the solvent loop, and two ports to the conduits of the inert gas circuit.

7. Apparatus according to any of the preceding embodiments, wherein two ports of the third multiport valve (3) are connected to the conduits of the inert gas circuit, and the other port(s) to the at least one sample vessel.

8. Apparatus according to any of the preceding embodiments, wherein the multiport valve (1) can be adjusted between at least two valve settings (I and II), wherein in setting I the two ports that are connected via the interfaces to the vessel are each linked by a port connected to the sample loop, such that the liquid sample of the solution present in the vessel is guided via the inlet interface through the sample loop and via the outlet interface back to the vessel, as a result of which the sample loop is filled with sample; and in setting I the two ports that are connected via the interfaces to the vessel are linked to one another, such that the solution is routed directly back to the vessel without passing through the sample loop, and the two ports that are connected to the sample loop are each linked to a port connected to the conduits of the inert gas circuit, such that the sample present in the sample loop can be routed via the inert gas circuit to the sample distribution unit and thence to at least one sample vessel.

9. Apparatus according to any of the preceding embodiments, wherein the multiport valve (2) can be adjusted between at least two valve settings (I and II), wherein in setting I the two ports that are connected to the reservoir vessel are each linked to a port connected to the solvent loop, such that the solvent is routed with the aid of the pump from the reservoir vessel via the solvent loop back to the reservoir vessel, as a result of which the solvent loop is filled with solvent; and in setting I the two ports that are connected to the reservoir vessel are linked to one another, such that the solvent is routed with the aid of the pump from the reservoir vessel directly back to the reservoir vessel without passing through the solvent loop, and the two ports connected to the solvent loop are each linked to a port connected to the conduits of the inert gas circuit, such that the solvent present in the solvent loop can be routed via the inert gas circuit to the multiport valve (1).

10. Apparatus according to any of the preceding embodiments, wherein the inert gas circuit via which al the multiport valves present are connected to one another comprises the following conduits:

a conduit that leads from an inert gas source to the second multiport valve (2) via a valve that can be used to control the inert gas supply;

a conduit that leads from the second multiport valve (2) to the first multiport valve (1);

a conduit that leads from the first multiport valve (1) to the further multiport valve (22);

a conduit that leads from the further multiport valve (22) to the third multiport valve (3), preferably to the middle port of the third multiport valve (3);

at least one conduit, preferably two or more conduits, that lead(s) from the third multiport valve (3) to the at least one or more than one sample vessel;

one conduit each that leads from each sample vessel to the residue outlet, preferably one conduit each that leads from each sample vessel to one of the ports of the fourth multiport valve (4), where these ports can each be switched to an additional port, and a conduit that leads from the additional port of the fourth multiport valve (4) to the residue outlet.

11. Method of automated sampling of a liquid sample from a vessel in which there may be a pressure of at least 20 bar, preferably of at least 50 bar, further preferably of at least 100 bar, more preferably of at least 150 bar, using the apparatus according to any or embodiments 1 to 10, wherein a) a liquid sample is taken from the vessel and stored intermediately in the sample loop of the sample circuit;

b) a solvent is taken from the reservoir vessel and stored intermediately in the solvent loop of the solvent circuit;

c) an inert gas is present in the conduits of the inert gas circuit; and d) the sample is taken by altering the position of the valve present and of the multiport valves such that the solvent stored intermediately in the solvent loop is routed by the inert gas to the sample stored intermediately in the sample loop, and the sample diluted with the solvent is transported thence via the sample distribution unit to one or more sample vessels.

12. Method according to embodiment 11, wherein the default position of the valves and of the multiport valves of the apparatus according to any of embodiments 1 to 10 has the following features:

the at least one valve of the inert gas circuit is closed;

the first multiport valve (1) is set to setting I;

the second multiport valve (2) is set to setting I;

the multiport valve (22) is set to setting I, wherein the conduits from the multiport valve (1) and to the multiport valve (3) via the multiport valve (22) are connected to one another such that the restriction capillary is bypassed;

the middle port of the third multiport valve (3) is switched to the port that leads to the residue outlet or, if present, to the fourth multiport valve (4); and the port of the multiport valve (4), if present, which is connected to the third multiport valve (3) Is switched to the middle port of the fourth multiport valve, wherein the middle port leads to the residue outlet.

13. Method according to embodiment 11 or 12, wherein the valve of the inert gas circuit is opened first.

14. Method according to embodiment 12 or 13, wherein the sample is taken by altering the above-described default position of the valves present (including multiport valves) according to the following sequence:

1) the at least one valve of the inert gas circuit is opened, preferably for at least 5 seconds and up to 120 seconds, more preferably for up to 90 seconds;

2) the middle portion of the third multiport valve (3) Is switched to the port that leads to a sample vessel, in order to purge the sample vessel with inert gas, and a port of the fourth multiport valve (4) that comes from the sample vessel is optionally switched to the middle port of the fourth multiport valve (4) toward the residue outlet;

3) the at least one valve of the inert gas circuit is closed;

4) the second multiport valve (2) is set to setting II;

5) the first multiport valve (1) is set to setting II;

6) the valve of the inert gas circuit is opened;

7) the middle port of the third multiport valve (3) is switched to the port that leads to the residue outlet or—if present—to the fourth multiport valve (4), wherein, when the middle port of the third multiport valve leads to the fourth multiport valve (4), a port of the multiport valve (4) is switched to the port that leads to the residue outlet; and 8) all valves (including multiport valves) go back to the default position.

15. Method according to any of embodiments 11 to 14, wherein the total duration of the method steps 1) to 8) is not more than 480 seconds, preferably not more than 300 seconds, more preferably not more than 200 seconds.

BRIEF DESCRIPTION OF THE DRAWING

The FIGURE shows an embodiment of the apparatus according to the invention with 5 multiport valves.

DETAILED DESCRIPTION OF THE INVENTION

The apparatus according to the invention is an apparatus for automated sampling of a liquid sample from a vessel in which there may be a pressure of at least 20 bar, preferably of at least 50 bar, further preferably of at least 100 bar, more preferably of at least 150 bar, wherein the apparatus comprises the following:
- a sample circuit comprising a multiport valve (1) having at least 6 ports, a feed conduit, a drain conduit and a sample loop, wherein a liquid sample of the solution present in the vessel can be withdrawn via the sample circuit;
- a solvent circuit comprising a reservoir vessel for the solvent, a second multiport valve (2) having at least 6 ports, a pump, a feed conduit, a drain conduit and a solvent loop, wherein solvent for dilution of the sample can be added via the solvent circuit;
- one or more sample vessels into which the liquid sample, preferably diluted with the solvent, can be routed;
- a sample distribution unit comprising a third multiport valve (3) having at least 3 ports and at least one conduit connected to the one or more sample vessels, wherein the sample taken from the vessel via the conduit can be routed into the at least one sample vessel;
- a pressure regulation unit with which the samples can be brought to ambient pressure, wherein the pressure regulation unit comprises a further multiport valve (22) having a restriction capillary and wherein the multiport valve (22) is disposed between the multiport valve (1) and the multiport valve (3); and
- an inert gas circuit in which there is an inert gas, wherein the inert gas circuit comprises at least one valve, a feed conduit, a drain conduit, and conduits via which all the multiport valves present are connected to one another.

The apparatus according to the invention has the advantage that the liquid samples can be taken even at a high pressure. Pressure in the context of the present invention and hence also in the context of the description means a gas pressure. Any pressure FIGURE here means gauge pressure above ambient pressure (about 1 bar). The liquid samples that are taken, if they are under pressure, are sparged liquids. The sample loop may be filled or purged repeatedly with sample. If the sample is to be taken, the valve position of the first multiport valve (1) may be altered such that the sample loop is no longer connected to the vessel from which the sample is taken. In this way, it is possible that a different pressure is applied to the sample loop, and there is no longer any need for the (high) pressure prevailing in the vessel from which the sample is taken.

A conduit in the context of the present invention means a suitable hollow body through which gases and liquids can be transported. Examples of these are hoses or tubes made of plastics or metals. Corresponding conduits are available on the market in a wide variety of different colours, shapes and materials. Depending on the liquid to be sampled, a person skilled in the art may select suitable conduits or suitable hoses or tubes.

The vessel from which the sample is being taken may be any vessel in which a liquid to be examined occurs. Suitable vessels are known to the person skilled in the art. In a preferred embodiment, the vessel is a reactor in which a chemical reaction is proceeding or has proceeded. It is then possible to take samples during the reaction and to study the progression of the reaction.

According to the invention, it is preferable if the sample distribution unit of the apparatus described here comprises an additional multiport valve (4) having at least 6 ports. This multiport valve (4) is then the fourth multiport valve (4) overall. If there is such a fourth multiport valve (4) in the sample distribution unit of the apparatus according to the invention, this multiport valve (4) is likewise connected to the inert gas circuit. The multiport valve (4) is also connected via at least one conduit to the sample vessel(s). These conduits are especially the drain conduit of the one or more sample vessels, meaning that the sample can be conveyed out of the sample vessels thereby. The at least one conduit of the sample distribution unit which is connected via the multiport valve (3) to the one or more sample vessels then functions as feed conduit via which the sample vessel can be filled with sample.

The apparatus of the invention permits sampling from vessels in which there is a pressure of at least 20 bar, preferably of at least 50 bar, further preferably of at least 100 bar, more preferably of at least 150 bar. Of course, it is also possible to use the apparatus to take samples from a vessel having a lower pressure than 20 bar. The upper pressure limit is determined by the properties of the devices and apparatuses used. It is preferable in the context of the present invention that the pressure in the vessel from which the sample is taken is not more than 500 bar, preferably not more than 490 bar, more preferably not more than 480 bar.

Proceeding from the pressure within the vessel from which the sample is to be taken, it may be the case that the sample has to be brought to ambient pressure (about 1 bar). If the pressure in the vessel is already ambient, this is of course unnecessary. Normal depressurization can be effected in quite a simple manner downstream of the sample loop of multiport valve (1), for example via a valve. In technical terms, it is thus fundamentally quite simple to achieve the release of pressure. Specifically when samples are being taken from vessels under high pressure, there may be problems here such as foam formation or the release of a portion of the sample. In that case, sampling is nevertheless possible, but is disadvantageous. In the context of the present invention, the apparatus according to the invention therefore has a pressure regulation unit with which the samples can be brought to ambient pressure in a controlled manner. The regulation by the release of the pressure is necessary in accordance with the invention only when a sample is being taken from a vessel at a pressure higher than ambient pressure. The pressure regulation unit enables gradual release of the sample pressure without leading to partial loss of the sample or to foam formation. The pressure regulation unit comprises a further multiport valve (22) having a restriction capillary. The multiport valve is disposed between the multiport valve (1) and the multiport valve (3). There is thus a conduit from the multiport valve (1) to the multiport valve (22) and a conduit from the multiport valve (22) to the multiport valve (3). The restriction capillary especially has a suitably narrow diameter to be able to release the pressure slowly enough. In this state, the multiport valve may have at least two settings. In setting I of the multiport valve, the conduits from the multiport valve (1) and to the multiport valve (3) via the multiport valve (22) are connected to one another such that the restriction capillary is bypassed. This may be the case, for example, in purging operations or in the default position. In setting II of the multiport valve (22), the conduits from the multiport valve (1) and to the multiport valve (3) via the multiport valve (22) are connected to one another such that the flow passes through the restriction capillary and the pressure can be released from the sample in a regulated manner.

In a further-preferred embodiment, the multiport valve (22) with the restriction capillary additionally has a reservoir loop for inert gas, which is advantageously at a high pressure of more than 100 bar. In this embodiment, there are at least two settings for the multiport valve (22). In the first setting, the incoming sample is routed through the restriction capillary (22) and can thus be degassed. Thence, the sample passes through the third multiport valve (3) to the sample vessel. At the same time, the reservoir loop is being filled with inert gas under a high pressure of at least 100 bar. In the second setting, the conduit via which the sample arrives at the multiport valve (22) is switched to the conduit to the third multiport valve (3). A sample. Inert gas or solvent could then pass through unrestricted. In the second position of the multiport valve (22), the reservoir loop is switched to the restriction capillary. This removes sample residues from the restriction capillary in order to avoid cross-contamination. After passing through the restriction capillary, the inert gas is routed into the offgas.

With regard to the temperature that may exist in the vessels or on sampling, the apparatus of the invention is limited solely by the properties of the apparatuses, valves or conduits used. The sample properties may also constitute a limit in respect of the maximum temperature. For example, it may be advantageous when the boiling temperature of the sample is not exceeded on expansion. It is nevertheless possible in principle that samples can be taken with the apparatus according to the invention even at temperatures of >100° C.

The multiport valves (1, 2, 3, 4) and the connection of the ports to the respective conduits, loops and vessels are to be elucidated hereinafter. All multiport valves have at least 6 ports, and there may also be additional ports that can fulfil additional functions. The connections of the ports that are described here is a preferred basic design which, however, may also be varied in a certain manner.

It is preferable according to the present invention when two ports of the first multiport valve (1) are connected via two interfaces to the vessel from which the samples are to be taken. i.e. one inlet and one outlet of the vessel, two ports to the sample loop, and two ports to the conduits of the inert gas circuit.

With regard to the second multiport valve (2), it is preferable if two ports of the multiport valve (2) are connected to the reservoir vessel for the solvent, i.e. one inlet and one outlet, two ports to the solvent loop, and two ports to the conduits of the inert gas circuit.

Especially in the case of the third and fourth multiport valves (3, 4), depending on the number of sample vessels, there may be more than 3 ports. Thus, it is preferable if two ports of the third multiport valve (3) are connected to the conduits of the inert gas circuit, and the other port(s) to the at least one sample vessel. The number of ports is thus variable depending on the number of sample vessels. In a preferred embodiment, each port is connected to one sample vessel. In one embodiment with 6 ports in the third multiport valve (3), for example, there is a maximum of 4 sample vessels; in the case of 7 ports in the third multiport valve (3), there is a maximum of 5 sample vessels.

If there is a fourth multiport valve (4), preferably two ports of the multiport valve (4) are connected to the conduits of the inert gas circuit, and the other ports to the at least one sample vessel, especially the outlet of the at least one sample vessel. It is preferable that the multiport valves (3) and (4) have the same number of ports. The connection or the ports is dependent here on the number of sample vessels and the connections of the sample vessels to the third multiport valve (3). The connections of the fourth multiport valve (4) to the sample vessel(s) preferably correspond to the connections of the third multiport valve (3) to the sample vessel(s), except that the ports of the fourth multiport valve (4) are connected to the outlet of the sample vessel(s), while the ports of the third multiport valve (3) are connected to the inlet of the sample vessel(s). This has the advantage over al that the number of sample vessels is variable and can be matched to the specific requirements in the case of the respective sampling. It may be preferable if the multiport valves (3) and (4) switch in parallel, and the respective input port of one multiport valve corresponds to the output port of the other multiport valve. However, it is also possible to switch the two multiport valves (3, 4) independently of one another.

In a particularly preferred embodiment of the present invention, the third multiport valve (3) and/or the fourth multiport valve (4) each have a middle port in the sample distribution unit. Such a middle port is a common port by which all other ports can be connected. It is then preferable that the third multiport valve (3) and/or the fourth multiport valve (4) have a middle port that can be switched to each of the at least 2 other ports.

For sampling, the multiport valves can be adjusted to different valve settings. This and the valve settings are to be elucidated in detail hereinafter. In a preferred embodiment of the present invention, the multiport valve (1) can be adjusted between at least two valve settings (I and II), wherein in setting I the two ports that are connected via the interfaces to the vessel are each linked by a port connected to the sample loop, such that the liquid sample of the solution present in the vessel is guided via the inlet interface through the sample loop and via the outlet interface back to the vessel, as a result of which the sample loop is filled with sample; and In setting II the two ports that are connected via the interfaces to the vessel are linked to one another, such that the solution is routed directly back to the vessel without passing through the sample loop, and the two ports that are connected to the sample loop are each linked to a port connected to the conduits of the inert gas circuit, such that the sample present in the sample loop can be routed via the inert gas circuit to the sample distribution unit and thence to at least one sample vessel.

In setting I, the sample loop is accordingly filled with the liquid sample. In setting II, the connection of the sample loop to the vessel is cut and a connection to the inert gas circuit is established, which enables onward conduction of the sample into the sample vessel(s). By virtue of the sample loop in setting II also being decoupled from the vessel for pressure purposes, the desired automated sampling proceeds even at a high pressure present in the vessel. It will be apparent that the setting I always precedes the setting II in order to fill the sample loop with sample. Otherwise, no sampling would be possible.

A comparable situation is also preferred for the second multiport valve (2). In a preferred embodiment of the present invention, the multiport valve (2) can be adjusted between at least two valve settings (I and II), wherein in setting I the two ports that are connected to the reservoir vessel are each linked to a port connected to the solvent loop, such that the solvent is routed with the aid of the pump from the reservoir vessel via the solvent loop back to the reservoir vessel, as a result of which the solvent loop is filled with solvent; and in setting II the two ports that are connected to the reservoir vessel are linked to one another, such that the solvent is routed with the aid of the pump from the reservoir vessel directly back to the reservoir vessel without passing through the solvent loop, and the two ports connected to the solvent loop are each linked to a port connected to the conduits of the inert gas circuit, such that the solvent present in the solvent loop can be routed via the inert gas circuit to the multiport valve (1).

In a preferred embodiment, the two multiport valves (1) and (2) may be actuated individually, meaning that the respective setting I or II is established independently of the setting of the respective other multiport valve. This in principle results in two options. The first option is that the solvent mixes with the sample present in the sample loop and is guided to the sample distribution unit and thence to at least one sample vessel. In this case, the two multiport valves (1) and (2) are in setting II.

The second option is passage through the apparatus according to the invention or the sample loop and all further conduits without sample, by means of which it is firstly possible to purge the apparatus according to the invention in order to avoid cross-contamination, for example, and secondly to take a blank sample. In this case, there is thus no new sampling, meaning that the multiport valve (1) remains in setting I and only the multiport valve (2) is in setting II. In this connection, it is possible that, in the purging operation, the solvent is not routed through a sample vessel but guided directly to the outlet. This can avoid soiling of the sample vessel. If a blank sample is taken, this is of course routed into a sample vessel.

It is further preferable that the second multiport valve (2) is connected to the feed conduit of the inert gas circuit. This means that the inert gas is thus routed first to the multiport valve (2) and then arrives first at the first multiport valve. Such a solvent circuit has the advantage that there is no need for the sample first to be displaced from the sample loop by the inert gas; instead, the solvent functions as a buffer between inert gas and sample and dilutes the sample. The solvent, or the option of guiding solvent through the sample loop, also has the further advantage that the sample loop can be cleaned. This can avoid cross-contamination between successive samples.

The pump used for the solvent circuit may be any suitable pump. Corresponding pumps are known to the person skilled in the art. According to the invention, the pump of the solvent circuit is preferably an HPLC pump, a membrane pump, a centrifugal pump, a gear pump or a toothed ring pump.

The inert gas circuit of the apparatus according to the invention contains an inert gas. The inert gas used may be any gas which is inert toward the sample material. There must be no reaction between sample and inert gas in order not to distort the sample. The inert gas is preferably a known inert gas, especially nitrogen, argon or helium. Particular preference is given to nitrogen. The inert gas may be supplied to the inert gas circuit from a suitable source, for example from a gas bottle or from inert gas conduits available at the location of the apparatus. The feeding and dosage of the inert gas into the inert gas circuit are effected via the valve present. This valve of the inert gas circuit is preferably a magnetic valve or a pneumatic valve, but it is preferably a magnetic valve. These valves enable exact dosage and can preferably be controlled in an automated manner.

The inert gas circuit has a residue outlet via which samples and/or solvents and/or the inert gas are removed from the apparatus. But there may also be a collecting device in which samples and solvents are collected before being disposed of. A suitable waste vessel would be conceivable here. But direct disposal into the sewer system without a waste vessel is also conceivable if sample and solvent do not contain any hazardous substances. It would also be possible for the sample to be routed back into the vessel from which it has been removed. In that case, however, a solvent already present in that vessel should be used, for example as solvent or as reactant or product of a chemical reaction.

The excess inert gas obtained in the sampling and/or in a subsequent purge may preferably be guided through the waste vessel into the offgas. For this purpose, the waste vessel may be decompressed overhead via an inertized offgas conduit present in the inert gas circuit. Such an offgas conduit may also include the reservoir vessel for the solvent, in order to route or expand gases obtained therein, for example including residues of the inert gas, into the offgas.

In a particularly preferred embodiment of the present invention, the inert gas circuit via which all the multiport valves present are connected to one another comprises the following conduits:

a conduit that leads from an inert gas source to the second multiport valve (2) via a valve that can be used to control the inert gas supply;

conduit that leads from the second multiport valve (2) to the first multiport valve (1);

a conduit that leads from the first multiport valve (1) to the further multiport valve (22);

a conduit that leads from the further multiport valve (22) to the third multiport valve (3), preferably to the middle port of the third multiport valve (3);

at least one conduit, preferably two or more conduits, that lead(s) from the third multiport valve (3) to the at least one or more than one sample vessel;

one conduit each that leads from each sample vessel to the residue outlet, preferably one conduit each that leads from each sample vessel to one of the ports of the fourth multiport valve (4), where these ports can each be switched to an additional port, and a conduit that leads from the additional port of the fourth multiport valve (4) to the residue outlet.

With regard to the sample vessels, in the context of the present invention, at least one sample vessel is to be present. For particular applications, however, it may be advantageous when the apparatus of the invention comprises two or more sample vessels. This is because, if two or more sample vessels are present, it is possible to take multiple samples in an automated manner within very short intervals, which would be implementable only with difficulty by manual means. This is advantageous especially in the case of analysis/sampling of very rapid reaction kinetics. Suitable sample vessels are known in principle to the person skilled in the art. Examples are simple plastic or glass vessels, for example corresponding vials, tubes or cuvettes. The sample vessels, according to the present invention, are preferably vials, more preferably glass vials, that can be used in a gas chromatography analysis. The sample vessel(s) are preferably each closed with a septum. A suitable septum is, for example, a septum that can be penetrated by a cannula while retaining sufficient mechanical and chemical stability. Such a cannula that penetrates the septum may then constitute the inlet and outlet. There are preferably at least two cannulas, one for the inlet and one for the outlet.

The sample vessel(s) may be disposed in a holder, for example a sample block. This can simplify the handling and simplify the storage of the sample vessels. To increase safety, the sample vessels may also each be disposed in a cup, with the cup acting as a burst guard. There may also be a capture dish disposed beneath the holder or sample block in order to be able to capture liquid escaping from the sample vessels. Corresponding capture dishes may also be disposed beneath the reservoir vessel and/or the waste vessel. Unnecessary and possibly hazardous stains and contamination of the working environment of the apparatus according to the invention with the substances used, i.e. solvent and sample, can thus be avoided.

The present invention further provides a method of automated sampling of a liquid sample from a vessel in which there may be a pressure or at least 20 bar, preferably of at least 50 bar, further preferably of at least 100 bar, more preferably of at least 150 bar, using the apparatus according to the invention as described above, wherein
   a) a liquid sample is taken from the vessel and stored intermediately in the sample loop of the sample circuit;
   b) a solvent is taken from the reservoir vessel and stored intermediately in the solvent loop of the solvent circuit;
   c) an inert gas is present in the conduits of the inert gas circuit; and
   d) the sample is taken by altering the position of the valve present and of the multiport valves such that the solvent stored intermediately in the solvent loop is routed by the inert gas to the sample stored intermediately in the sample loop, and the sample diluted with the solvent is transported thence via the sample distribution unit to one or more sample vessels.

If purging of the apparatus according to the invention is to be conducted, step a) is omitted, i.e. no sample is stored intermediately in the sample loop. It is also conceivable in principle that the sample is taken without solvent. In that case, the sample is pushed out of the sample loop to the sample vessel by the inert gas. In that case, step b) can be dispensed with. Step d) is then altered correspondingly in each case.

The valve here is the valve of the inert gas circuit. The multiport valves are the multiport valves (1), (2) and (3) present. The position of the valve(s) of the inert gas circuit and of the multiport valves (1), (2) and (3) have already been discussed with regard to the apparatus. The multiport valves (1) and (2) can preferably be set to setting I and setting II. The valve(s) of the inert gas circuit may preferably be open or closed. The third multiport valve (3) can adopt various settings according to the number of sample vessels. A particular setting or the third multiport valve (3) is that in which the multiport valve (3) is switched directly to the residue outlet and not routed to the sample vessel.

The default position of the valves and of the multiport valves of the apparatus according to the invention relates to the juncture in the method before a (new) sample is taken. The default position has the following features:
   the at least one valve of the inert gas circuit is closed;
   the first multiport valve (1) is set to setting I;
   the second multiport valve (2) is set to setting I;
   the multiport valve (22) is set to setting I, wherein the conduits from the multiport valve (1) and to the multiport valve (3) via the multiport valve (22) are connected to one another such that the restriction capillary is bypassed;
   the middle port of the third multiport valve (3) is switched to the port that leads to the residue outlet or, if present, to the fourth multiport valve (4); and
   the port of the multiport valve (4), if present, which is connected to the third multiport valve (3) is switched to the middle port of the fourth multiport valve, wherein the middle port leads to the residue outlet.

It may be preferable if the pump of the solvent circuit does not operate in all the valves and multiport valves present are in the default position. Proceeding from this default position, the settings of the valves and of the multiport valves have to be altered in order to take a sample from the vessel in accordance with the invention. It is possible here in principle that the setting of all valves and multiport valves is altered all at once. However, it is preferable in the context of the present invention if the setting of the valves and of the multiport valves is altered gradually.

In a preferred embodiment, the valve of the inert gas circuit is opened first. The other multiport valves are adjusted thereafter. In the present process, the sample is taken by altering the above-described default position of the valves present (including multiport valves) according to the following variable sequence:
   1) the at least one valve of the inert gas circuit is opened, preferably for at least 5 seconds and up to 120 seconds, more preferably for up to 90 seconds;
   2) the middle portion of the third multiport valve (3) is switched to the port that leads to a sample vessel, in order to purge the sample vessel with inert gas, and a port or the fourth multiport valve (4) that comes from the sample vessel is optionally switched to the middle port of the fourth multiport valve (4) toward the residue outlet;
   3) the at least one valve of the inert gas circuit is closed;
   4) the second multiport valve (2) is set to setting II;
   5) the first multiport valve (1) is set to setting II;
   6) the valve of the inert gas circuit is opened;
   7) the middle port of the third multiport valve (3) is switched to the port that leads to the residue outlet or—if present—to the fourth multiport valve (4), wherein, when the middle port of the third multiport valve leads to the fourth multiport valve (4), a port of the multiport valve (4) is switched to the port that leads to the residue outlet; and
   8) all valves (including multiport valves) go back to the default position.

It should be added that the pump of the solvent circuit begins to operate before step 4) is conducted. Furthermore, if a sparged liquid is being removed, the flow should pass through the restriction capillary of the pressure regulation unit. In that case, it would also be necessary to switch the corresponding multiport valve (22) to setting II. This may preferably precede step 6). The pump can be started simultaneously with one of steps 1) to 3) or else in between. In addition, this pump is also switched off again in step 8).

If the apparatus according to the invention is to be purged or a blank sample is to be taken, step 5) is dispensed with, as a result of which solely solvent is routed through the conduits of the apparatus. If the sample is to be taken without solvent, step 4) is dispensed with. As a result, the sample is pushed out of the sample loop solely by the inert gas.

The aforementioned sequence serves to illustrate the present process. It has already been stated that the multiport valves may also be linked to one another differently, or another sequence may be selected. Thus, it would also be possible for the second multiport valve (2) also to remain in the default position. i.e. setting I, and for step 5) accordingly not to be implemented. In this way, it would also be possible to provide an undiluted sample, which is useful for particular applications. The illustrative sequence also does not include the option that a blank sample is taken. In such a case, the first multiport valve (1) would remain in the default position, i.e. setting I, and step 4) would not be implemented. Thus, solely solvent would be routed to the sample vessel and analysed as a blank sample.

The valve setting of the individual steps 1) to 8) or of all alternative method variants is typically maintained for a certain period in order to ensure that the liquids and gases have indeed been guided sufficiently through the conduits. However, it is possible only with difficulty to specify an exact determination of a minimum duration for the valve setting, because this depends on the exact construction and the valves and conduits used, etc. In a preferred embodiment of the present invention, the valve settings of the individual steps 1) to 8) or of all alternative process variants are maintained for 1 to 120 seconds, preferably for 5 to 90 seconds.

A particular feature of the present process is thus that it is possible to take an inert, non-backmixed sample even within a short period of time. Proceeding from the default position, it is possible to take the first sample within a few seconds after the purging with inert gas in steps 1) to 3). Once the first sample has been taken, it is first necessary to purge again before a further sample is taken. This is the time-determining step of the method according to the invention. Nevertheless, the time intervals between two samples are comparatively short and are less than 150 seconds, preferably less than 135 seconds, preferably less than 120 seconds. The total duration of the process of steps 1) to 8) is therefore preferably not more than 480 seconds, further preferably not more than 300 seconds, more preferably not more than 200 seconds.

The apparatus according to the invention is shown in schematic form in the FIGURE. This is an illustrative embodiment that should not restrict the present invention.

The FIGURE shows an embodiment with 5 multiport valves (1, 2, 3, 4, 22). The sample circuit here is defined by the first multiport valve (1), a feed conduit (15) from the vessel (7), a drain conduit (16) to the vessel (7), and the sample loop (14). The solvent circuit comprises a reservoir vessel (6) for the solvent, the second multiport valve (2), a feed conduit (11) from the reservoir vessel (6), a drain conduit (10) to the reservoir vessel (6), and a solvent loop (12). The pump by which the solvent is guided from the reservoir vessel (6) by the feed conduit (11) to the multiport valve (2) is not shown here. The sample vessel(s) (5) is/are filled via the sample distribution unit, the third multiport valve (3), at least one conduit (19) connected to the sample vessel (5), at least one conduit (20) that leads away from the sample vessel (5) and is connected to the fourth multiport valve, and the fourth multiport valve (4). It will be apparent that the fourth multiport valve can also be omitted here. The further multiport valve (22) with restriction capillary (24) constitutes the pressure regulation unit by which pressure can be released in a controlled manner, and controlled and gradual decompression of the sample is possible. All the multiport valves present (1, 2, 3, 4, 22) are connected via the inert gas circuit. The inert gas circuit comprises a valve (8) by which the feed stream of inert gas is controlled. The inert gas passes via the feed conduit (9) into the apparatus and is first guided to the second multiport valve (2). The drain conduit (21) of the inert gas circuit then leads from the fourth multiport valve (4) to the residue outlet. All the multiport valves present (1, 2, 3, 4, 22) are connected via the inert gas circuit by means of the conduits (13, 17, 18, 23). For sampling, the sample loop (14) is first filled (setting I as described above). Subsequently, the sample is routed with inert gas, and optionally with solvent, from the solvent loop (12) by the sample loop (14) via the conduit (17) to the multiport valve (22), thence via conduit 23 to the multiport valve (3), and thence via conduit (19) to the sample vessel (5).

EXAMPLES

In a sampling system according to the invention which is shown in schematic form in the FIGURE, the sampling was tested at a high pressure.

Example 1

A reactor (Parr Instrument Company HD autoclave 250 ml) was initially charged with toluene. The reactor was brought to 200 bar by injection of nitrogen and heated to 145° C. On attainment of pressure and temperature, diisobutene was metered in in a mass ratio of toluene/diisobutene of 80:20, and the resultant mixture was analysed with the sampling system according to the invention by repeated sampling. Samples were taken here after 3 minutes, 6 minutes, 10 minutes, 15 minutes, 30 minutes, 45 minutes, 60 minutes, 90 minutes, 1200 minutes and 2400 minutes, and analysed for the mass ratio by means of gas chromatography (FID detector). A mass ratio of 80:20 of toluene to diisobutene was found here in a reproducible manner.

Example 2

A reactor (Parr Instrument Company HD autoclave 250 mi) was initially charged with 135 g of toluene together with a catalyst system consisting of 12 mg of Rh(acac)$CO_2$ and 0.15 g of Alkanox P240. The mixture was heated to 140° C., brought to 170 bar by injection of synthesis gas ($CO:H_2$ about 50:50), and mixed thoroughly.

On attainment of pressure and temperature, 30 g of 2-ethyl-1-hexene were metered in, and the hydroformylation that took place was analysed with the sampling system according to the invention (the FIGURE) by repeated sampling. Samples were taken here after 15 minutes, 30 minutes, 45 minutes, 75 minutes, 135 minutes and 195 minutes, and analysed for the mass ratio of the reactants by means of gas chromatography (FID detector).

TABLE 1

Results of gas chromatography after automatic sampling

| Reaction time/min | 0 | 15 | 30 | 45 | 75 | 135 | 195 |
|---|---|---|---|---|---|---|---|
| Sampling system: GC conversion of alkenes/% | 0 | 6.1 | 22.9 | 71.1 | 93.8 | 99.5 | 99.9 |

The invention claimed is:
1. An apparatus for automated sampling, comprising:
a sample circuit comprising a first multiport valve having at least 6 ports, a first feed conduit, a first drain conduit, and a sample loop, wherein the sample circuit is configured to withdraw a liquid sample from a sample circuit vessel containing a solution,
a solvent circuit comprising a reservoir vessel for a solvent, a second multiport valve having at least 6 ports, a pump, a second feed conduit, a second drain conduit, and a solvent loop, wherein the solvent circuit is configured to add the solvent for dilution of the liquid sample;

at least one sample vessel, wherein the at least one sample vessel is configured for the liquid sample to be routed into;

a sample distribution unit comprising a third multiport valve having at least 3 ports and at least one conduit connected to the at least one sample vessel, wherein the liquid sample taken from the sample circuit vessel via the at least one conduit can be routed into the at least one sample vessel;

a pressure regulation unit configured to bring the liquid sample to ambient pressure, wherein the pressure regulation unit comprises a fifth multiport valve having a restriction capillary wherein this the fifth multiport valve is disposed between the first multiport valve and the third multiport valve: and inert gas portions in which there is an inert gas, wherein the inert gas portions comprise at least one valve and a third feed conduit both operational connected to the second multiport valve, and a third drain conduit operationally connected to the third multiport valve;

and a plurality of conduits via which the first multiport valve, the second multiport valve, the third multiport valve, and the fifth multiport valve, are connected.

2. The apparatus according to claim 1, wherein the sample distribution unit has a fourth multiport valve.

3. The apparatus according to claim 1, wherein the inert gas is nitrogen, argon, or helium.

4. The apparatus according to claim 1, wherein a pressure in the sample circuit vessel from which the liquid sample is to be taken is at least 20 bar and not more than 500 bar.

5. The apparatus according to claim 1, wherein of the at least 6 ports of the first multiport valve:

two ports are connected via two interfaces to the sample circuit vessel, two ports are connected to the sample loop, and two ports are connected to the plurality of conduits.

6. The apparatus according to claim 5, wherein the first multiport valve is configured to be adjusted between at least two valve settings (I and II), wherein in setting I, the two ports that are connected via the two interfaces to the sample circuit vessel are each linked by one of the two ports connected to the sample loop, such that a liquid sample of the solution present in the sample circuit vessel is guided via an inlet interface of the two interfaces through a sample loop and via an outlet interface of the two interfaces back to the sample circuit vessel, as a result of which the sample loop is filled with the liquid sample; and in setting II, the two port that are connected via the two interfaces to the sample circuit vessel are linked to one another, such that the solution is routed directly back to the sample circuit vessel without passing through the sample loop, and the two ports that are connected to the sample loop are each linked to one of the two ports connected to the plurality of conduits, such that the liquid sample present in the sample loop can be routed via the inert gas portions to the sample distribution unit and then to the at least one sample vessel.

7. The apparatus according to claim 1, wherein of the at least 6 ports of the second multiport valve:

two ports are connected to the reservoir vessel for the solvent, two ports are connected to the solvent loop, and two ports are connected to the plurality of conduits.

8. The apparatus according to claim 7, wherein the second multiport valve is configured to be adjusted between at least two valve settings (I and II), wherein in setting I, the two ports that are connected to the reservoir vessel are each linked to one of the two polis connected to the solvent loop, such that tile solvent is routed with an aid of the pump from the reservoir vessel via the solvent loop back to the reservoir vessel, as a result of which the solvent loop is filled with the solvent; and in setting II, the two polis that are connected to the reservoir vessel are linked to one another, such that the solvent is routed with the aid of the pump from the reservoir vessel directly back to the reservoir vessel without passing through the solvent loop, and the two ports connected to the solvent loop are each linked to one of two ports connected to the plurality of conduits, such that the solvent present in the solvent loop can be routed via the inert gas portions to the first multiport valve.

9. The apparatus according to claim 1, wherein of the at least 3 ports of the third multi port valve: two ports of the third multiport valve are connected to the plurality of conduits, and the at least third port is connected to the at least one sample vessel.

10. The apparatus according to claim 1, wherein the plurality of conduits comprises:

a conduit that leads from an inert gas source to tile second multiport valve via a valve configured to control supply of the inert gas;

a conduit that leads from the second multiport valve to the first multiport valve;

a conduit that leads from the first multiport valve to the fifth multiport valve; a conduit that leads from the fifth multiport valve to the third multiport valve:

at least one conduit that lead(s) from the third multiport valve to the at least one sample vessel;

and one conduit each that leads from each of the at least one sample vessel to a residue outlet.

11. The apparatus according to claim 10, wherein the conduit that leads from the fifth multiport valve to the third multiport valve leads to a middle port of the third multiport valve.

12. The apparatus according to claim 10, wherein the at least one conduit that leads from the third multiport valve to the at least one sample vessel comprises at least two conduits.

13. The apparatus according to claim 10, wherein each of the one conduit each that leads from each of the at least one sample vessel to the residue outlet is a conduit that leads from one of the at least one sample vessel to the fourth multiport valve before leading from the fourth multiport valve to the residue outlet.

14. A method of automated sampling, the method comprising: providing the apparatus of claim 1, taking the liquid sample from the sample circuit vessel and storing the liquid sample intermediately in the sample loop of the sample circuit;

taking the solvent from the reservoir vessel and storing the solvent intermediately in the solvent loop of the solvent circuit;

providing the inert gas in the plurality of conduits; and taking the liquid sample by altering a position of the at least one valve of the inert gas portions and of the first multiport valve, the second multiport valve, the third multiport valve, and the fifth multiport valve, such that the solvent stored intermediately in the solvent loop is routed by the inert gas to the liquid sample stored intermediately in the sample loop, and the liquid sample diluted with the solvent is transported then via the sample distribution unit to the at least one sample vessel.

15. The method according to claim 14, wherein during the method the apparatus is in a default position, and when in the default position the apparatus is configured as follows:

the at least one valve of the inert gas portions is closed;
the first multiport valve is set to setting I, wherein two ports of the at least 6 ports of the first multiport valve are connected via two interfaces to the sample circuit vessel and are each linked by one of two ports of the first multiport valve connected to the sample loop, such that the liquid sample of the solution present in the sample circuit vessel is guided via an inlet interface of the two interfaces through the sample loop and via an outlet interface of the two interfaces back to the sample circuit vessel, as a result of which the sample loop is filled with the liquid sample;
the second multiport valve is set to setting I, wherein two ports of the at least 6 ports of the second multiport valve are connected to the reservoir vessel and are each linked to one of two ports of the second multiport valve connected to the solvent loop, such that the solvent is routed with an aid of the pump from the reservoir vessel via the solvent loop back to the reservoir vessel, as a result of which the solvent loop is filled with the solvent;
the fifth multiport valve is set to setting I, wherein a conduit from the first multiport valve and a conduit to the third multiport valve via the fifth multiport valve are connected to one another such that the restriction capillary is bypassed; and
a middle port of the third multiport valve is switched to a port that leads to a residue outlet.

16. The method according to claim 15, wherein the liquid sample is taken by altering the default position according to the following sequence:

1) the at least one valve of the inert gas portions is opened;
2) the middle port of the third multiport valve is switched to the port that leads to the at least one sample vessel, in order to purge the at least one sample vessel with inert gas, and, if present, a port of the fourth multiport valve that comes from the at least one sample vessel is optionally switched to the middle port of the fourth multiport valve toward the residue outlet;
3) the at least one valve of the inert gas portions is closed;
4) the second multiport valve is set to setting II, wherein the two ports is that are connected to the reservoir vessel are linked to one another, such that the solvent is routed with the aid of the pump from the reservoir vessel directly back to the reservoir vessel without passing through the solvent loop, and the two ports connected to the solvent loop are each linked to one of two ports of the second multiport valve connected to the plurality of conduits of the inert gas portions, such that the solvent present in the solvent loop can be routed via the inert gas portions to the first multiport valve;
5) The first multiport valve is set to setting II, wherein the two ports that are connected via the two interfaces to the sample circuit vessel are linked to one another, such that the solution is routed directly back to the sample circuit vessel without passing through the sample loop, and the two ports that are connected to the sample loop are each linked to one of two ports of the first multiport valve connected to the plurality of conduits, such that the liquid sample present in tile sample loop can be routed via the inert gas portions to the sample distribution unit and then to the at least one sample vessel;
6) tile at least one valve of the inert gas portions is opened;
7) the middle port of the third multiport valve is switched to the port that leads to the residue outlet or, if present, to the fourth multiport valve, wherein when the middle port of the third multiport valve leads to the fourth multiport valve, a port of the fourth multiport valve is switched to the port that leads to the residue outlet; and
8) the at least one valve of the inert gas portions, and the first multiport valve, tile second multiport valve, the third multiport valve, the fifth multiport valve, and, if present, the fourth multiport valve, go back to the default position.

17. The method according to claim 16, wherein a total duration of 1) to 8) is not more than 480 seconds.

18. The method according to claim 17, wherein the total duration of 1) to 8) is not more man 200 seconds.

19. The method according to claim 14, wherein in 1), the at least one valve of the inert gas portions is opened for at least 5 seconds and up to 120 seconds.

20. The method according to claim 14, wherein the at least one valve of the inert gas portions is the first valve opened.

* * * * *